3,605,494
HEAT FLOW CALORIMETER
Richard Carl Progelhof, Berkeley Heights, and Norman Zethward Shilling, Lyndhurst, N.J., assignors to American Standard Inc., New York, N.Y.
Filed Dec. 5, 1969, Ser. No. 882,581
Int. Cl. G01k 17/00
U.S. Cl. 73—190H                  8 Claims

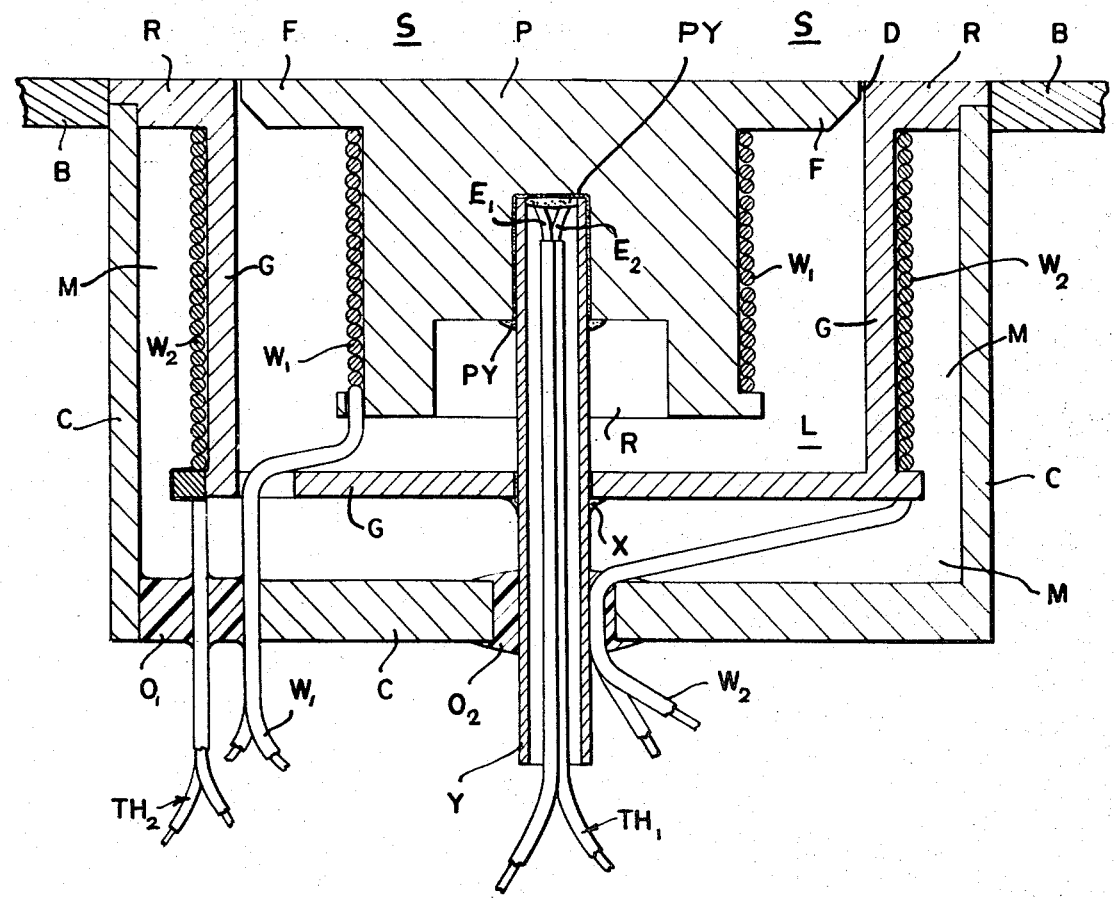

ABSTRACT OF THE DISCLOSURE

Covers a heat flux probe for measuring or determining the dissipation of heat to an external body or surface. The probe includes two coaxial cylindrical conductive units and a non-conductive housing which may also be coaxial with the two units, the housing exposing one face or side of the innermost unit to the external body or surface. Both units have peripheral heating coils which receive currents to maintain both units at a common temperature. Both units are supported by a common non-conductive member.

---

This invention relates to heat flux probes and calorimeters and like equipments for measuring the rate of heat transfer to an external body or space. More particularly, this invention relates to such equipments which are particularly adapted for sensing the rate of heat transfer through a wall member or other discontinuity into a surrounding or an adjacent atmosphere. The term "discontinuity," as used herein, generally refers to the interface between two media. For example, a discontinuity may be the barrier or line of demarkation between a solid medium and a liquid medium, or between a solid medium and a gaseous medium, or between a gaseous medium and a liquid medium, etc.

The equipment of this invention is particularly suited for determining or measuring either the rate at which heat is transferred from a particular body, whether stationary or moving, to the space adjacent to the body or from one body to another body, or the total quantity of heat transferred in a given time interval. For example, the equipment of this invention may be used on, or may be adapted to be used with, a moving body, such as an aircraft or other moving vehicle, for determining the amount of heat which is convected from the moving vehicle or aircraft, or from the wing of the aircraft, or from any vehicle, into the space in which the aircraft or vehicle is moving. This invention may also be used, for example, for determining the changes in the amount of heat transferred into space as the moving body, namely, the aircraft, is traveling through the surrounding space either when the speed is maintained constant or is rising or falling.

Throughout the specification, references will be made to the heat transfer, or to the rate of heat transfer, between the apparatus of this invention as illustrated and external space or an external body. It will be understood that the apparatus measures the rate of heat transfer and, if the heat transfer rate remains constant over a specified time interval, the total quantity of heat transferred may obviously be determined from the product of the heat transfer rate and the time interval.

This invention will be better understood from the more detailed description and explanation hereinafter following when read in connection with the accompanying drawing illustrating one form of heat measuring equipment for determining the heat dissipation from one body to another or to the adjoining space.

The arrangement shown in the drawing illustrates a heat flux sensor or calorimeter of an active type, i.e., a sensor or calorimeter which employs an internal source of energy in contrast to one which is devoid of any such source of energy. This calorimeter includes an inner sensing plug P, an outer guard structure G, and a case or housing C. Electrical power is supplied to a coil W1 which is positioned along the outer rim of the plug P as shown, and a suitable amount of power is furnished to the guard structure G via a coil W2 which is mounted along the outer rim of the guard G as shown. The amount of current supplied to both coils W1 and W2 is such as to maintain a zero temperature difference, or a substantially zero temperature difference, between the plug P and the guard structure G.

Both the plug P and the guard structure G are fabricated preferably from a high conductivity material, such as brass, while the case C is fabrictaed preferably from a low conductivity material such as any phenolic material. The gap L between the plug P and the guard structure G is fairly large in relation to the relative sizes of the devices so as to maximize the thermal resistance or impedance interposed by the gap L.

A tube Y is positioned at the center or axis of the plug P to provide a support for the plug P. The tube Y is preferably made of a low conductivity metallic material such as stainless steel. This tube Y has a relatively thin wall. This tube Y is intended to exhibit a relatively high thermal resistance to minimize heat dissipation toward it from plug P. A thermocouple TH1 mounted within tube Y serves to monitor and measure the temperature of the plug P. The electrodes of thermocouple TH1 are designated E1 and E2 they may be made of iron and constantan, respectively, and they may be buttwelded to the upper end or roof of the support tube Y. The support tube Y may be affixed to plug P by means of a sutiable cementing material PY, such as conductive epoxy. Another thermocouple TH2 is affixed to the guard structure G by any suitable means such as a conductive epoxy. The temperature of the guard structure G, which is controlled by the current flowing through the adjacent coil W2, is observed by means of the thermocouple TH2.

The windings W1 and W2 will be employed to furnish heat through their resistive windings which are made of any suitable materials.

It will also be observed that there is a gap M between the case C and the guard structure G. The gap M is employed to minimize the dissipation of heat between the case C and the guard structure G. This, therefore, reduces the heat loss and also reduces the amount of power required to maintain the guard structure G and plug P at a predetermined temperature notwithstanding the expected losses of heat to the adjacent external medium S. The losses through the medium M depend on the climatic temperature, speed of movement of the body B. weather conditions, elevation in space, etc.

The composite unit is positioned in an aperture of the body B, adjacent to the space or fluid S, with a complete exposure of the front surface of plug P which is in intimate contact at the interface with space S. The flange F of plug P, which is immediately adjacent to the external space S, is reduced in thickness near the outer rim R of the guard structure G to minimize the heat loss between the guard structure G and the plug P. Obviously, the thinner the flange F, or, in other words, the greater the volume of space L between the guard structure G and the plug P, the smaller will be the dissipation or heat loss between the two elements. There is a gap D between the flange F and the rim R of the guard structure G, the effect of which is to further minimize heat loss between the plug P and the guard structure G.

The shell or case C may be composed of a linen phenolic material, or any other suitable low conduction material. By employing a low heat conductivity material in shell C, the dissipation of heat through the shell C will be further minimized, thereby further improving the accuracy of the overall arrangement as a sensing or measuring equipment and, at the same time, improving the efficiency of operation of the arrangement.

The thermocouple TH2 may be soldered or otherwise affixed to the guard G, as shown, to prevent the thermocouple TH2 from being withdrawn from the case C. The opening 01 in case C, through which the thermocouple TH2 traverses, may be filled with a suitable non-conductive cementing material, such as non-conductive epoxy. Both thermocouples TH1 and TH2 may be covered with an insulation material, such as fiberglass, and two electrodes of the thermocouples indicated, may be made, respectively, of iron and constantan. A similar cementing material, such as non-conductive epoxy, may be inserted into the opening 02 of shell C through which the tube Y is inserted.

In accordance with this invention, although the temperatures of the elements P and G are held substantially at the same value, their common temperature, however, should be maintained higher than that of the adjoining space S so that the flow of energy will be continually directed toward the space S. By maintaining the temperatures of the units P and G alike, there will be substantially no relative flow of heat energy in either direction between the two units. Whatever variations in temperature occur due to the thermal conditions encountered in atmosphere S by the calorimeter will be promptly reflected in the changes in temperatures of the units P and G as indicated by the thermocouples TH1 and TH2. Because substantially no heat can be dissipated through the case C, all of the generated heat will be dissipated substantially entirely to the adjacent external atmosphere S which may be generally referred to as a discontinuity.

In one construction of the instrument, according to this invention, the plug P was cylindrical in shape and had an outer diameter at its rim of about 0.52 inch. The guard structure G, within which the plug P is inserted, had a maximum outer diameter of ¾″ and an overall or axial length of .35″. The case or shell C, which houses the mechanism, also had a maximum outer diameter of ¾″ and a depth of 0.45 inch.

The convective film coefficient $h_c$ of heat transfer from the calorimetric instrument to the space S adjoining the wall B may be determined from the following formula:

$$Q_c = h_c A_p (T_p - T_s) = Q_e - Q_r$$

In this formula, $Q_c$ designates the convective energy transferred, $A_p$ is the area of the plug P exposed to the outer space S, and $T_p$ and $T_s$ represent the temperatures of the plug P and the outer space S, respectively. The quantity $Q_c$ will be equal to the difference between the energy $Q_e$ fed to coil W1 (i.e. the product of the current and its voltage fed into the coil W1) and the amount of radiant energy transferred to space S. The quantity of radiant energy may be designated $Q_r$. The dissipated radiant energy $Q_r$ may be estimated according to any standard or well known formula.

The convective energy coefficient $h_c$ as determined mathematically from the above formulation will be characteristic of the particular body B while traveling in space S. It represents a significant numerical quantity and may be employed for comparing the convective energy coefficient of this particular body with different bodies or regions to determine their relative efficiencies for heat transfer.

Each of the coils W1 and W2 is wound as a bifilar winding. This may be accomplished either by parallelling two resistive wires throughout a helix, or by twisting the two resistive wires around each other and then forming the twisted pair into a helix. Such bifilar windings have the property of producing equal and opposite electromagnetic fields due to the flow of opposing currents through the respective windings, with the result that each such bifilar windings will yield a field which is virtually non-magnetic or of a very small or negligible magnetic magnitude. The efficiency of the equipment was improved by the use of bifilar windings.

The two coils W1 and W2 may be simply connected to a common source of voltage by means of two conventional potentiometers, each connected between one of the coils and the voltage source, to regulate the magnitude of the current flowing therethrough. The two potentiometers may be regulated by hand or by any automatic arrangement by which the adjusting arms of the two potentiometers will be moved in response to the respective temperatures of the plug P and the guard structure G to bring the temperatures up to the same predetermined value. During periods when the plug and guard structures are at identical temperatures, the heat dissipation in the intermediate space L will be negligible.

The instrument is especially suitable to measure and determine the convective heat coefficient between the body B and the outer space S. A plurality of like units may be positioned at selected points along body B to determine the relative convective heat transfer coefficients. Each instrument is solidly constructed to avoid movement of the parts of the instrument.

A copending application of R. C. Progelhof, filed of even date and assigned to the same assignee, discloses a suitable form of arrangement of the plug component and its method of fabrication. Another copending application of R. C. Progelhof and G. G. Govesky, filed of even date and assigned to the same assignee, discloses another form of arrangement of a heat probe or calorimeter.

While this invention has been shown and described in said particular arrangements merely for illustrative and explanatory purposes, it will be understood that the general principles of this invention and the general arrangement of the components may be applied to other and widely varied organizations without departing from the spirit and scope of this invention.

What is claimed is:

1. A unitary structure for measuring the rate of heat dissipated through a discontinuity, comprising two concentric cylindrical metallic heated units spaced from each other by a gap, one of the units having a surface exposed to the discontinuity, means for maintaining both units at substantially the same temperature, means for observing the respective temperatures of both units, a housing of thermally non-conductive material enclosing but spaced from both units except for said surface exposed to the discontinuity, and a common supporting structure for both units whereby the power necessary to maintain said units at said same temperature is a measure of the rate of heat dissipation.

2. A unitary structure according to claim 1 in which there are two current-carrying coils of resistive wire circumferentially wound about the respective metallic units to maintain both units at the same temperature.

3. A unitary structure according to claim 2 in which the temperature observing means are two thermocouples which are adjacent to the respective coils for observing the temperatures of the units about which the coils are wound.

4. A unitary structure according to claim 1 in which there are two bifilarly wound coils arranged helically over the external surfaces of the respective units.

5. A unitary structure for measuring the rate at which heat is dissipated throughout a discontinuity, comprising a first cylindrical metallic heating unit having a surface exposed to the discontinuity, a non-conductive element affixed to the first unit to support the first unit, a second cylindrical metallic heating unit spaced from the first unit and surrounding the first unit except its exposed surface, means for maintaining both units at substantially the same temperature, means for observing the respective temperatures of both units, a thermally non-conductive cylindrical case spaced from the second unit and surrounding said second unit whereby the power necessary to maintain said units at said same temperature is a measure of the rate of heat dissipation.

6. A unitary structure according to claim 5 including two current-carrying coils of resistive wire circumferentially wound about the outer surfaces of the respective units.

7. A unitary structure according to claim 5 including two bifilarly wound coils arranged helically over the external surfaces of said first and second units for supplying heat to the respective units to maintain both units at a common temperature.

8. A unitary structure according to claim 7 in which the temperature observing means comprises two thermocouples, one of the thermocouples being affixed to the non-conductive element and the second thermocouple being affixed adjacent to the coil associated with the second unit.

References Cited

UNITED STATES PATENTS

| 3,142,170 | 7/1964 | Calhoun | 73—15 |
| 3,256,734 | 6/1966 | Storke, Jr. | 73—193 |
| 3,267,728 | 8/1966 | Solomons | 73—190 |
| 3,367,182 | 2/1968 | Baxter | 73—15 |

OTHER REFERENCES

West et al.: "Automatic Temperature Regulation and Recording in Precision Adiabatic Calorimetry" in Review of Scientific Instruments, December 1957, vol. 28, No. 12, pp. 1070–1074.

RICHARD C. QUEISSER, Primary Examiner

H. GOLDSTEIN, Assistant Examiner